United States Patent Office 3,520,702
Patented July 14, 1970

3,520,702
METHOD OF MAKING DRIED PASTA HAVING A PROTEIN NETWORK THAT WITHSTANDS COOKING
Robert Menzi, 8 Avenue Devin du-Villag, Geneva, Switzerland
No Drawing. Filed May 1, 1967, Ser. No. 634,901
Claims priority, application Switzerland, May 3, 1966, 6,410/66
Int. Cl. A23l 1/16
U.S. Cl. 99—85  3 Claims

ABSTRACT OF THE DISCLOSURE

By adding a small quantity of an enzymatic substance, dried pasta can be made which, when cooked, is elastic and non-sticky, this being true whether the semolina is from hard wheat or soft wheat.

---

This invention relates to a method of making dried pasta having a protein network which withstands cooking.

The criteria for evaluating the quality of pasta varies substantially from one country to another. Thus, pasta is sometimes graded by its raw state appearance, i.e. by its color and the state of its surface. Sometimes, the criteria is the way the pasta tastes after cooking. In Italy, where the consumer is very particular about pasta, it is the elasticity and the absence of sticking that is appreciated first and foremost. Good pasta, when fully cooked, must therefore remain highly elastic and its surface must be free of sticky starch paste. It is these two characteristics which are the most difficult to provide for in the course of manufacture.

To achieve this result, use must be made of hard wheat semolinas of very high quality and consequently of high cost and yet, even with such semolinas, the results can be poor. There is, in fact, no method of testing which makes it possible to know ahead of time whether or not a given semolina will yield elastic and non-sticky pasta. With soft wheat, it is impossible, with the currently used method, to make pasta which is satisfactory in these two respects.

The conventional method of making pasta consists in hydrating the semolina with about 30% of water, preparing the paste and then extruding the latter to produce pasta of the desired kind which is then dried. This method is carried out continuously by apparatus which generally comprise a trough in which a bladed shaft rotates for the production of a pasty mixture. This mixture is then extracted from the trough by a screw terminating in a cylinder in which rotates another screw which serves to knead and compress the paste which is then extruded through a die. The paste shreds are then laid on rods which then pass through a drying tunnel in which the air moisture becomes gradually lower.

Dried pasta has, among cereal derived foodstuffs, a very distinct microscopic structure. It has a continuous protein mixture phase (the gluten or the protein network) wherein the starch granules are dispersed. While cooking in hot water, the starch granules gelatinize, i.e. absorb water, swell and turn into starch paste. The gluten (the protein network) is denatured through cooking and if it is not sufficiently resistant, the starch granules, when swelling, can tear the meshes of its continuous phase, thereby giving rise, at the periphery of the pasta, to a viscous layer of starch paste. The state of the protein network after cooking can also affect the elasticity of the pasta. The main problem which has to be solved to obtain elastic and non-sticky pasta thus consists in increasing the resistance of the protein network to cooking. The addition of eggs to the semolina strengthens this network and it is known that pasta prepared with eggs withstands cooking better.

An object of the invention is to provide a method of making, from both soft and hard wheat semolina, dried pasta having a protein network which is highly resistant to cooking so that, once cooked, it has very good elasticity and is not sticky.

The method according to the present invention comprises adding to either of two starting substances, semolina and water, at least one enzymatic substance capable of setting up intermolecular bonds in said protein network, followed by preparation of the paste, kneading, extrusion and drying in known manner.

By way of enzymatic substance, use is preferably made of at least one of the following industrial enzymatic preparations: pancreatin, glucose-oxidase, catalase of bacterial origin, Takamine proteinase, SP 160 Takamine amylase and wheat germ lipase. The quantity to be added, before the preparation of the paste, to the semolina or to the water, is preferably 0.2 to 10 g. per 100 kg. of semolina. The best results are obtained with a quantity of about 2.5 g. per 100 kg.

In view of the fact that these enzymatic preparations, which preparations are all of natural origin, are added to the semolina in such extremely small quantities, they will cause no change in the pasta except an increase in the resistance to cooking of their protein network.

The method may be practised as follows:

Example 1

2.5 g. of pancreatin are added to 100 kg. of poor quality hard wheat semolina whereupon the pasta is prepared in the usual manner. The dried pasta, once cooked, after being kept stored for a week, exhibits an excellent elasticity and hardly sticks.

Pasta made from the same semolina but by the conventional method, i.e. without adding pancreatin, has poor elasticity and is very sticky.

Example 2

The same semolina is used in Example 1 but the pancreatin is replaced with the same quantity of glucose-oxidase. The resulting pasta, once cooked, exhibits a good elasticity and does not stick.

Example 3

The same semolina is used as in Example 1 but the pancreatin is replaced with 5 g. of catalase of bacterial origin. The resulting pasta, once cooked, exhibits a good elasticity and does not stick.

Example 4

The procedure is the same as in Example 1 except that the pancreatin is replaced with a mixture comprising 1.25 g. of glucose-oxidase and 1.25 g. of catalase of bacterial origin. The resulting pasta, once cooked, exhibits a good elasticity and does not stick.

Example 5

The procedure is the same as in Example 1 except that the 2.5 g. pancreatin is replaced with a mixture comprising 1.25 g. of sancreatin and 1.25 g. of glucose-oxidase. The resulting pasta, once cooked, exhibits an excellent elasticity and does not stick.

Example 6

7 g. of pancreatin are added to 100 kg. of soft wheat semolina, whereupon the pasta is prepared in the usual manner. The dried pasta, once cooked, exhibits a good elasticity and hardly sticks.

Pasta produced with the same semolina but by the conventional method, i.e. without the addition of the enzymatic substance, has poor elasticity and is very sticky.

Example 7

Use is made of the same semolina as in Example 6. The semolina is hydrated with water to which 1.25 g. of pancreatin and 1.25 g. of glucose-oxidase has been added. The resulting pasta, once cooked, exhibits an excellent elasticity and hardly sticks.

Example 8

Use is made of 100 kg. of a mixture consisting of 30 to 40% of soft wheat semolina having a low ash content (about 0.40%) and of 70 to 60% of hard wheat semolina (type O) to which is added a mixture of 1.25 g. of pancreatin and 1.25 g. of glucose-oxidase. The resulting pasta, once cooked, exhibits an excellent elasticity and does not stick.

I claim:

1. A method of making dried pasta from semolina and water, said pasta having a protein network which withstands cooking, said method comprising adding to either the semolina or the water, 0.2 to 10 gm. per 100 kg. of semolina of at least one enzymatic substance capable of setting up intermolecular bonds in said protein network, followed by preparing a paste from said semolina and water, kneading, extruding and drying said paste to form dried pasta.

2. A method according to claim 1, which comprises adding 2.5 g. of said enzymatic substance per 100 kg. of semolina.

3. A method according to claim 1, wherein said enzymatic substance is an industral enzymatic preparation selected from the group consisting of pancreatin, glucose-oxidase, catalase of bacterial origin, proteinase, amylase and wheat germ lipase.

References Cited

UNITED STATES PATENTS 3,262,783   7/1966   Blanchon _____ 99—85 XR

LIONEL M. SHAPIRO, Primary Examiner

J. R. HOFFMAN, Assistant Examiner